(12) United States Patent
Kulprathipanja

(10) Patent No.: US 11,167,258 B2
(45) Date of Patent: Nov. 9, 2021

(54) APPARATUS AND PROCESS FOR SEPARATING GASES FROM CATALYST AND REVAMP

(71) Applicant: UOP LLC, Des Plaines, IL (US)

(72) Inventor: Sathit Kulprathipanja, Schaumburg, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 16/412,044

(22) Filed: May 14, 2019

(65) Prior Publication Data
US 2020/0360884 A1    Nov. 19, 2020

(51) Int. Cl.
| | | |
|---|---|---|
| *B01J 8/00* | (2006.01) | |
| *C10G 70/04* | (2006.01) | |
| *B01J 8/18* | (2006.01) | |
| *C10G 11/18* | (2006.01) | |

(52) U.S. Cl.
CPC ............ *B01J 8/005* (2013.01); *B01J 8/1827* (2013.01); *B01J 8/1845* (2013.01); *C10G 11/182* (2013.01); *C10G 70/046* (2013.01); *B01J 2208/00761* (2013.01); *B01J 2208/00991* (2013.01); *B01J 2219/00024* (2013.01); *C10G 2300/1074* (2013.01); *C10G 2300/1077* (2013.01); *C10G 2300/706* (2013.01)

(58) Field of Classification Search
CPC ........ B01J 8/005; B01J 8/1827; B01J 8/1845; B01J 2208/00761; B01J 2208/00991; B01J 2219/00024; C10G 11/182; C10G 70/046; C10G 2300/1074; C10G 2300/1077; C10G 2300/706
See application file for complete search history.

(56) References Cited

U.S. PATENT DOCUMENTS

| | | |
|---|---|---|
| 2,440,620 A | 4/1948 | Taff |
| 2,612,438 A | 9/1952 | Murphree |
| 3,894,932 A | 7/1975 | Owen |
| 4,364,905 A | 12/1982 | Fahrig |
| 4,414,100 A | 11/1983 | Krug |
| 6,224,833 B1 | 5/2001 | Rall |
| 6,680,030 B2 * | 1/2004 | Koebel .................. B01D 53/10 422/139 |
| 7,179,427 B2 | 2/2007 | Marchant |
| 7,332,132 B2 | 2/2008 | Hedrick |
| 7,799,286 B2 | 9/2010 | Mehlberg |
| 9,388,095 B2 | 7/2016 | Leroy et al. |

(Continued)

*Primary Examiner* — Prem G Singh
*Assistant Examiner* — Brandi M Doyle
(74) *Attorney, Agent, or Firm* — Paschall & Associates, LLC; James C. Paschall

(57) ABSTRACT

In an FCC apparatus and process structured packing should be located at the very top of the stripping section in an upper region. The lower region below the structural packing may be equipped with fluidization equipment such as stripping media distributors and one or more gratings. This arrangement enables stripping of entrained hydrocarbons off the incoming catalyst immediately upon entry into the stripping section allowing the entrained hydrocarbon to exit the stripping section with minimized residence time to minimize post-riser cracking. Revamp of stripping sections with tall stripping sections should conducted in this way to improve performance and reduce down-time for equipment installation.

13 Claims, 1 Drawing Sheet

(56) References Cited

U.S. PATENT DOCUMENTS

| | | | |
|---|---|---|---|
| 2002/0008052 A1 | 1/2002 | Hedrick | |
| 2013/0130889 A1* | 5/2013 | Gbordzoe | B01J 23/02 502/77 |
| 2013/0292302 A1* | 11/2013 | Bories | C10G 11/187 208/48 R |
| 2016/0158741 A1 | 6/2016 | Palmas et al. | |
| 2019/0076815 A1* | 3/2019 | Lambert | B01J 19/32 |

* cited by examiner

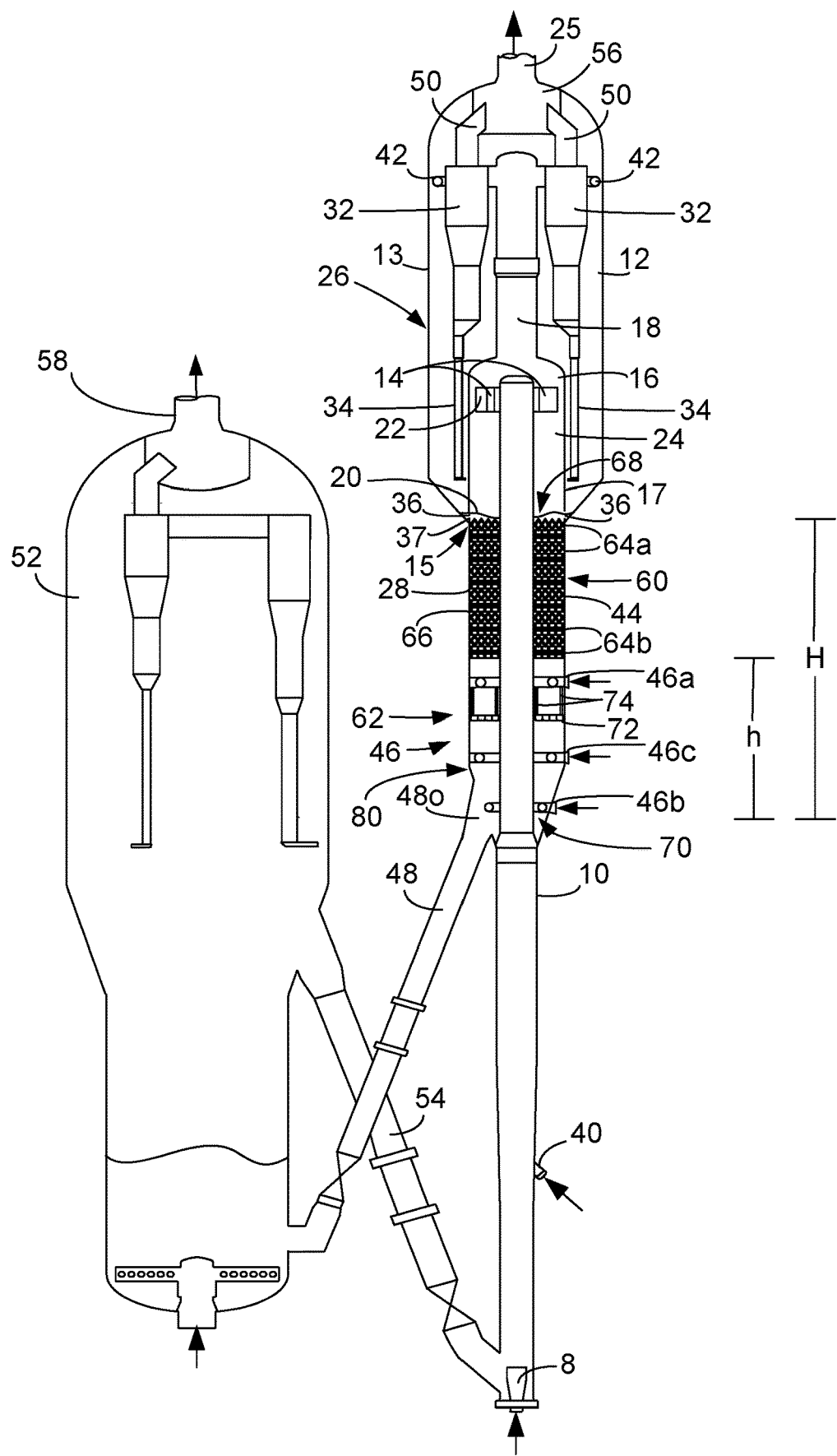

APPARATUS AND PROCESS FOR SEPARATING GASES FROM CATALYST AND REVAMP

FIELD

The field is processes and apparatuses for the fluidized contacting of catalyst with hydrocarbons. More specifically, the field is processes and apparatuses for separating entrained product hydrocarbon gases from catalyst particles.

BACKGROUND

Fluid catalytic cracking (FCC) is a process that contacts hydrocarbons in a reactor vessel with a catalyst composed of finely divided particulate material. The hydrocarbon feed and fluidizing gases, such as steam, fluidize the catalyst and typically transport it in a riser as the catalyst promotes the cracking reaction. As the cracking reaction proceeds, substantial amounts of hydrocarbon, called coke, are deposited on the catalyst. A high temperature regeneration within a regeneration vessel burns coke from the catalyst by contact with an oxygen-containing stream that again serves as a fluidization medium. Coke-containing catalyst, referred to herein as spent catalyst, is continually removed from the reactor vessel and replaced by coke-free or reduced coke catalyst from the regeneration zone. Fluidization of the catalyst particles by various gaseous streams allows the transport of catalyst between the reactor vessel and the regeneration vessel.

In the FCC process, gaseous fluids are primarily separated from particulate catalyst solids as they are discharged from a reactor riser. The primary separation is typically followed by a secondary separation of solids from gases in cyclones.

A predominance of the hydrocarbon vapors that contact the catalyst in the reaction zone are separated from the solid particles by the aforementioned separations. However, the catalyst particles employed in an FCC process have a large surface area, which is due to a great multitude of pores located in the particles. As a result, the catalytic materials retain hydrocarbons within their pores, upon the external surface of the catalyst and in the spaces between individual catalyst particles. Although the quantity of hydrocarbons retained on each individual catalyst particle is very small, the large amount of catalyst particles and the high catalyst circulation rate which is typically used in a FCC process results in a significant quantity of hydrocarbons being withdrawn from the reactor vessel with the catalyst.

It is common practice to remove, or strip, hydrocarbons from spent catalyst particles prior to passing the spent catalyst particles to the regeneration vessel to preserve yield of hydrocarbon products. The most common method of stripping the catalyst particles passes a stripping gas, usually steam, through a flowing stream of catalyst, counter-current to its direction of flow. Such steam stripping operations, with varying degrees of efficiency, remove the hydrocarbon vapors which are entrained with the catalyst and adsorbed on the catalyst particles.

The efficiency of catalyst stripping is increased by using stripping internals which cascade the catalyst from side to side as it moves down a stripping section and counter-currently contacts a stripping medium. The stripping medium enters from below the lowest layer of stripping internals and continues rising upwardly through the superjacent layers of stripping internals.

Stripping internals comprising vertically spaced inclined baffles cascade the catalyst from side to side as it moves down a stripping vessel and counter-currently contacts a stripping medium. Typical stripping vessels have a series of outer baffles in the form of frusto-conical sections that direct the catalyst inwardly onto a series of inner baffles. The inner baffles are centrally located conical or frusto-conical sections that divert the catalyst outwardly onto the outer baffles. Gratings with down comers comprise horizontal gratings with open down comer sections each typically aligned with a splash plate on the subjacent grating. More recently developed stripping internals utilize structural packing comprising multiple strips of metal provided in a patterned relationship to facilitate lateral catalyst movement and counter-current contacting of catalyst particles and stripping gas.

Better stripping of hydrocarbons from spent catalyst brings important economic benefits to the FCC process by reducing "delta coke". Delta coke is the fraction of coke on the spent catalyst less the fraction of coke on the regenerated catalyst. Reducing delta coke in the FCC process permits a lowering of the regenerator temperature. More of the resulting, relatively cooler regenerated catalyst is required to supply the fixed heat load in the reaction zone. Hence, the reaction zone may operate at a higher catalyst-to-feed or catalyst-to-oil (C/O) ratio. The higher C/O ratio increases conversion which increases the production of valuable products. Therefore, it is desirable to decrease delta coke by more efficient catalyst stripping.

Installing new equipment in an FCC unit can be expensive to a refiner who cannot make product during the downtime. Installing new equipment in an FCC reactor often requires multiple welds of the new equipment to the shell of the FCC vessel. This often requires breaking refractory lining, welding the equipment to the shell, post weld treatment to ensure structural strength and replacement of the lining. Installing new equipment by minimizing or eliminating welding to the shell of the FCC vessel is desired to minimized downtime for the refiner.

BRIEF SUMMARY

We have discovered the most efficient stripping configuration is to locate the structured packing at the top of the stripping section. If the stripping section is much taller than the height required for the structural packing, then the structural packing should be located at the very top of the stripping section in an upper region. The lower region below the structural packing may be equipped with fluidization equipment such as fluid distributors and one or more gratings. This arrangement enables stripping of entrained hydrocarbons from the incoming catalyst immediately upon entry into the stripping section thus enabling the entrained and adsorbed hydrocarbons to exit the stripping section with minimized residence time to minimize post-riser cracking. Revamp of FCC reactors with tall stripping sections should be conducted in this way to improve performance and reduce down time for equipment installation.

Additional details and embodiments of the invention will become apparent from the following detailed description of the invention.

BRIEF DESCRIPTION OF THE DRAWINGS

The Figure is a schematic cross-sectional view of an FCC unit.

DETAILED DESCRIPTION

We have observed in commercial operation that greater residence time of spent catalyst with entrained and adsorbed product hydrocarbon gases in the stripping section results in lower product yield. This may result from cracking reactions continuing to occur while the product gases are in contact with catalyst. Reducing the residence time of product hydrocarbon gases entrained with and adsorbed on catalyst particles in the stripping section will boost yield of hydrocarbon products with greater value.

Newer stripping internals have made stripping of hydrocarbons adsorbed on and entrained with spent catalyst more efficient. New stripping internals such as structural packing require less height of the stripping section for the stripper packing than for the conventional stripping internals they replaced. Hence, a revamp of a stripping section that involves replacing conventional internals with structural packing results in layers of structural packing occupying less than the entire height of the stripping section.

The structural packing may be located in a lower region of the stripping section closest to the catalyst outlet to the spent catalyst standpipe for delivering spent catalyst to the regenerator. This arrangement would leave an open space in an upper region between the inlet to the stripping section and the top layer of the structural packing located in the lower region of the stripping section. Equipment would have to be installed in the open space in the upper region of the stripping section above the structural packing to ensure good fluidization, minimize big bubble formation, and prevent bypassing of packing layers upon entry of the spent catalyst into the top layer of structural packing in the lower region. However, we have found that locating the structural packing in the lower region of the stripping section will increase the residence time of hydrocarbon product gases entrained with and adsorbed on the catalyst particles because the it takes longer for the hydrocarbon product gases to encounter the more efficient layers of structural packing. Understanding that greater hydrocarbon residence time in the stripping section results in yield loss leads to realization that locating the structural packing in the upper region is superior.

Moreover, installing several layers of gratings with down comers in the upper region of a conventional stripping section requires refractory lining to be broken at all the points at which the grating or its support structure will be welded to the shell of the stripping section. Additionally, the welds must be heat treated to ensure its robustness during operation. Lastly, the refractory lining will have to be reinstalled around the areas where the welds were made. All of this takes additional time which costs the refiner revenue loss while not process feed into product.

We propose to locate the structural packing in the upper region of the stripping section to reduce the residence time of the hydrocarbon in the stripping section and to reduce or eliminate the number of gratings in the stripping section.

The apparatus or process may be conducted in a fluid catalytic cracking (FCC) unit in which gaseous hydrocarbon products are separated from spent catalyst particles. The typical feed to an FCC unit is a gas oil such as a vacuum gas oil or atmospheric residue.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures". As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio. As used herein, the term "T5" or "T95" means the temperature at which 5 mass percent or 95 mass percent, as the case may be, respectively, of the sample boils using ASTM D-86 or TBP. As used herein, the term "initial boiling point" (IBP) means the temperature at which the sample begins to boil using ASTM D-7169, ASTM D-86 or TBP, as the case may be. As used herein, the term "end point" (EP) means the temperature at which the sample has all boiled off using ASTM D-7169, ASTM D-86 or TBP, as the case may be. As used herein, "vacuum gas oil" means a hydrocarbon material having an IBP of at least about 232° C. (450° F.), a T5 of between about 288° C. (550° F.) and about 392° C. (700° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric residue as determined by any standard gas chromatographic simulated distillation method such as ASTM D2887, D6352 or D7169, all of which are used by the petroleum industry. As used herein, "atmospheric residue" means a hydrocarbon material having an IBP of at least about 232° C. (450° F.), a T5 of between about 288° C. (550° F.) and about 392° C. (700° F.), typically no more than about 343° C. (650° F.), and a T95 between about 510° C. (950° F.) and about 700° C. (1292° F.) obtained from the bottoms of an atmospheric crude distillation column.

FIG. 1 is the schematic illustration of an FCC unit. The FCC unit includes an elongated riser or reactor riser 10. Hot catalyst is delivered to a lower section of the riser 10 from a regenerator conduit 54 at which a fluidizing gas from a distributor 8 pneumatically conveys the catalyst particles upwardly through the riser 10. As the mixture of catalyst and conveying gas continues up the riser 10, a nozzle 40, or a plurality of nozzles, injects heavy hydrocarbon feed and perhaps fluidizing media such as steam into the catalyst stream. The contact with hot catalyst vaporizes the hydrocarbons and further conveys the mixture of gas and catalyst through the riser 10 while cracking the hydrocarbons to desirable lower-boiling, gaseous products.

The reactor riser 10 is maintained at high temperature conditions which may generally include a temperature above about 425° C. (797° F.). In an embodiment, the reactor riser 10 is maintained at cracking conditions which include a temperature of from about 480° C. (896° F.) to about 590° C. (1094° F.) and a pressure of from about 69 kPa (g) (10 psig) to about 517 kPa (g) (75 psig) but typically less than about 275 kPa (g) (40 psig). The catalyst-to-oil ratio, based on the weight of catalyst and feed hydrocarbons entering the bottom of the riser, may range up to 20:1 but is typically between about 4:1 and about 10:1. Hydrogen is not normally added to the riser generating an absence of substantial added hydrogen in the reactor riser 10. Steam is typically passed into the riser 10 to effect catalyst fluidization and feed dispersion. The average residence time of catalyst in the riser 10 may be less than about 5 seconds. The type of catalyst employed in the process may be chosen from a variety of commercially available catalysts. A catalyst comprising a Y-type zeolite base material is preferred, but the older style amorphous catalyst may be used if desired. MFI zeolite may be added to the catalyst mixture.

The riser 10 extends upwardly into a reactor vessel 12. The riser 10 preferably has a vertical orientation within the reactor vessel 12 and may extend upwardly through a bottom of the reactor vessel 12. The reactor vessel comprises an outer wall 13. The catalyst particles and gaseous products are discharged from the top of the reactor riser 10 and separated into a cracked gaseous products and catalyst particles covered with substantial quantities of coke and generally referred to as "spent catalyst." A swirl arm arrangement 26 may be provided at the discharge end of the reactor riser 10 for enhanced initial separation of catalyst particles from cracked gaseous products. Other riser termination devices may be used such a vented riser or other types of devices that generate a quick separation upon discharge from the riser. The swirl arm arrangement 26 includes a curved tubular arm 14 that induces the solid catalyst particles and gaseous products to swirl in an angular direction, imparting a tangential angular velocity to the exiting mixture of catalyst particles and cracked gaseous products as they are discharged from an outlet 22. The swirl arm arrangement 26 may be located in a disengaging section 24 of a disengaging chamber 16. The disengaging chamber 16 comprises an outer shell 17. The swirl arm arrangement 26 may comprise a plurality of arms 14 with a corresponding number of outlets 22. The disengaging chamber 16 is in downstream communication with the outlet 22. The term "communication" means that fluid flow is operatively permitted between enumerated components. The term "downstream communication" means that at least a portion of fluid flowing to the subject in downstream communication may operatively flow from the object with which it fluidly communicates. A stripping section 28 may be located in the disengaging chamber 16 below the disengaging section 24. Catalyst separated by the swirl arm arrangement 26 drops down into the stripping section 28. The stripping section 28 may be in downstream communication with the outlet 22. The reactor vessel 12 is maintained at similar temperature and pressure as the riser 10.

The cracked gaseous products, comprising cracked hydrocarbons and entrained spent catalyst particles, ascend from the disengaging chamber 16 via a gas recovery conduit 18. Cyclones 32 are in downstream communication with the outlet 22 via the gas recovery conduit 18. The cyclones 32 create a tangential swirling motion therein to establish centripetal forces that further separate gases from catalyst particles. A product gas stream, relatively free of catalyst particles, exits the cyclones 32 through vapor outlet pipes 50 into a plenum chamber 56. The product stream then exits the reactor vessel 12 through an outlet 25. Catalyst solids recovered by the cyclones 32 exit the bottom of the cyclone through diplegs 34. The diplegs 34 extend downwardly in the reactor vessel 12 and may terminate at a flapper valve which prevents gas from entering the dipleg 34 but allows catalyst particles to exit into and generate a dense bed 20 at a bottom of the reactor vessel 12 surrounding the disengaging chamber 16 comprising a reactor annulus 37.

Catalyst particles in the reactor vessel 12 are admitted by passages 36 into the disengaging chamber 16. The passages 36 may comprise windows between the reactor vessel 12 and the disengaging chamber 16 to allow catalyst to flow from the reactor annulus 37 into the disengaging chamber 16. The disengaging chamber 16 may be in downstream communication with the reactor vessel 12 and/or the cyclones therein through the passages 36 due to gravity and head pressure. Catalyst particles in the dense catalyst bed 20 enter the stripping section 28 located in the disengaging chamber 16 to generate the dense bed at a top of the stripping section at the height of the passages 36. Catalyst particles pass downwardly through the stripping section 28 to be counter-currently contacted with a stripping media such a steam to strip gaseous hydrocarbon products entrained with the catalyst particles or adsorbed on the catalyst particles from the catalyst particles. An intersection 15 is defined at a wall 13 of the reactor vessel 12 and the shell 17 of the disengaging chamber 16.

The stripping section 28 has a height H that extends from a top 68 of the stripping section located at a bottom of the passages 36 to a bottom 70 of the stripping section at the middle of the spent catalyst outlet 480. The stripping section 28 may typically be at least 20 ft. (6.1 m), suitably at least 22 ft. (6.7 m) and preferably at least 25 ft. (7.6 m) tall. The stripping section 28 may typically be no more than at least 30 ft. (9.1 m), suitably no more than 40 ft. (12.2 m) tall.

The stripping section 28 comprises an upper region 60 and a lower region 62. The upper region 60 contains stripping internals comprising structural packing 66 including layers 64a, 64b of structural packing. The structural packing 66 may comprise a plurality of elongated metal strips arranged together in a pattern in the stripping section 28. The strips may have straight portions set at angles to other strips or other straight portions of the same strip. Layers 64a, 64b of strips may be stacked in the stripping section 28. Layers 64a may be oriented at angles to adjacent layers 64b such as perpendicularly. Examples of suitable structural packing may be found in US 2005/0205467 for use in stripping vessels. In the embodiment of the Figure, the structural packing 66 circumferences the riser 10.

A top of the structural packing 66 may be located at a top of the dense catalyst bed 20. In other words, a top of a top layer 64a of the structural packing 66 may be located at a top of the dense catalyst bed 20. The top layer 64a may be located even with or just below the passages 36. Moreover, the top layer 64a may be even with or just below the top 68 of the stripping section 28 and/or the intersection 15. Accordingly, the top of the structural packing 66 is located at a top 68 of the stripping section 28. In other words, no more than a height of a layer of packing 64a, 64b separates the top layer 64a of the structural packing from the top 68 of the stripping section 28.

A stripping media, typically steam, is distributed to the lower region 62 of the stripping section 28 through at least one stripping media distributor 46. A plurality of stripping media distributors 46 may located in the lower region 62 to distribute stripping media to the stripping section 28. A primary stripping media distributor 46a may be located at the highest location in the lower region 62 of the stripping media distributors 46. A secondary stripping media distributor 46b may distribute stripping media to the bottom 70 of the stripping section 28. Optionally, a tertiary stripping media distributor 46c may distribute stripping media to the stripping section 28 from a location between the primary stripping media distributor 46a and the secondary stripping media distributor 46b. Additional stripping media distributors 46 may be used as well in the lower region. The primary stripping media distributor 46a may comprise a wreath distributor comprising several conduits branching from a plurality of headers fed by a main header. The secondary stripping media distributor 46b and the tertiary stripping media distributor 46c may be ring distributors. The stripping media distributors 46 may be supported by brackets located at circumferential coordinates around the interior of the stripping section 28 or other suitable support structure. The stripping media distributors may have openings in the bottom of the conduits for emitting stripping media that ascends from the openings around the distributor to the upper region 60.

The lower region 62 has a height h that extends from a bottom 68 of the stripping section 28 located at the middle of the catalyst outlet 48o to a bottom of the lowest layer 64b of structural packing. The lower region may typically be at least 10 feet (3 m) tall, suitably at least 15 ft. (4.6 m) and preferably at least 25 ft. (7.6 m) tall.

A grating 72 may be located in the lower region 62 of the stripping section 28. The grating 72 may comprise strips of metal turned on edge with a first set of strips with planar faces parallel to each other and crossed by a second set of strips with parallel planar faces perpendicular to the planar faces of the first set. Suitable gratings may be found in U.S. Pat. No. 6,680,030. Catalyst descending in the lower region 62 may pass through gratings to maintain fluidization of the catalyst as it passes through the lower region. A grating 72 may be located below a stripping media distributor 46 for distributing a fluidizing media above the grating in the lower region 62. In the Figure, the grating 72 is located below the stripping media distributor 46 such as the primary stripping media distributor 46a. A grating 72 may be located above a stripping media distributor 46 for distributing fluidizing media below the grating in the lower region 62. In the Figure, secondary stripping media distributor 46b and tertiary stripping media distributor 46c are below the grating 72 in the lower region 62. The grating 72 may omit splash plates to enable catalyst to pass through the grating without blockage.

More gratings 72 may be located in the lower region 62. A grating 72 may be supported by the stripping media distributor 46. For example, the grating 72 is suspended by rods 74 welded, latched, hooked or otherwise secured to the superjacent stripping media distributor 46a. Additionally, rods (not shown) secured to a subjacent distributor 46 may support a grating 72 above the stripping media distributor 46. By supporting gratings 72 in this way, supports for the grating 72 do not need to be welded to the shell 17 of the disengaging chamber 16 reducing the down time required for installing new stripping internals.

In the lower region 62, the spacing between a fluidizing media distributor 46 or grating 72 can be maximized while maintaining appropriate fluidization because the stripping out of hydrocarbons has been achieved in the upper region 60. A grating 72 or a stripping media distributor 46 may be no farther than 10 feet (3 m) from the closest adjacent grating or stripping media distributor. In an aspect, the grating 72 or stripping media distributor 46 can be no closer than 7 feet (2.1 m) and suitably no closer than 5 feet (1.5 m) from the closest adjacent grating or media distributor. The grating 72 or the stripping media distributor 46 may be installed at a greater distance from the next closest grating or stripping media distributor in the lower region 62 than the greatest spacing of a layer 64a of structural packing 66 from the next closest layer of structural packing 64b in the upper region 60.

Counter-current contact of the catalyst particles over the structural packing 66 in the upper region 60 with the stripping media from the fluidizing media distributors 46 in the lower region 62 displaces product gases adsorbed on and entrained with the catalyst particles as it continues downwardly through the upper region 60 of the stripping section 28. Consequently, hydrocarbons are limited to the upper region 60 and not admitted to the lower region 62 thus minimizing residence time of hydrocarbons in the stripping section 28. Thus, the upper region 60 is a hydrocarbon rich environment compared to the lower region 62 in that the concentration of hydrocarbon in the upper region is greater than in the lower region. The upper region 60 is a stripping media lean environment compared to the lower region 62 in that the concentration of stripping media in the upper region is smaller than in the lower region. In the lower region 62, most of the hydrocarbons have been stripped from catalyst particles entering the lower region 62. Thus, the lower region 62 is a stripping media rich environment compared to the upper region 60 in that the concentration of stripping media in the lower region is greater than in the upper region. The lower region 62 is a hydrocarbon lean environment compared to the upper region 60 in that the concentration of hydrocarbon in the lower region is smaller than in the upper region.

Stripped catalyst from the stripping section 28 may pass through the spent catalyst outlet 48o through the spent catalyst conduit 48 in route to a catalyst regenerator 52. In the regenerator, coke deposits are combusted from the surface of the catalyst by contact with an oxygen-containing gas at high temperature. Following regeneration, regenerated catalyst particles are delivered back to the bottom of the riser 10 through the regenerator conduit 54. Flue gas exits the regenerator 52 through nozzle 58.

The catalyst regenerator is preferably operated at a pressure of from about 69 kPa (g) (10 psig) to about 552 kPa (g) (80 psig). The spent catalyst being charged to the regenerator may contain from about 0.2 to about 15 wt-% coke. This coke is predominantly comprised of carbon and can contain from about 3 to about 12 wt-% hydrogen, as well as sulfur and other elements. The oxidation of coke will produce the common combustion products: water, carbon oxides, sulfur oxides and nitrous oxides. The regenerator may take several configurations, with regeneration being performed in one or more stages.

The process and apparatus permit stripping of product hydrocarbon gases from catalyst particles while minimizing residence time of hydrocarbons in the stripping section 28. Operation in this way enables maintenance of a high yield of naphtha range hydrocarbons without giving them the opportunity to crack to smaller molecules while in contact with the catalyst particles. The process and apparatus can be effectuated easily by revamp of an FCC unit with a relatively tall stripping section 28.

The stripping section 28 can be revamped by shutting down an FCC reactor 10 and removing old stripping internals from the stripping section. The old stripping internals formerly spanned from a top elevation of a top stripping internal in the upper region 60 in the stripping section 28 perhaps at the top 68 of the stripping section 28 to a bottom internal in the lower region 62 such as at a former bottom elevation 80. The bottom layer 64b of the structural packing 66 can be installed in the upper region 60 of the stripping section 28 above the former bottom elevation 80. A bottom layer 64b of the structural packing 66 may be installed at least 10 feet (3 m) and suitably at least 12 ft. (3.7 m) above the former bottom elevation 80. A primary fluidizing media distributor 46a would have to be installed in the lower region 62 of the stripping section 28 with a support such as brackets welded to the shell 17. Additional fluidizing media distributors 46 may be installed in the lower region. A grating 72 may also be installed in the lower region 62 perhaps below or above a fluidizing media distributor 46. The grating 72 may be supported on the primary fluidizing media distributor 46a. A grating 72 or a stripping media distributor 46 may be installed no farther than 10 feet (3 m) and no closer than 5 feet (1.5 m), suitably no closer than 7 feet (2.1 m), from the next closest grating or stripping media distributor. The grating 72 or a stripping media distributor 46 may be installed at a greater distance from the next closest grating or stripping media distributor than the greatest spacing of a layer 64*a* of packing 66 from the next closest layer of packing 64*b* in the upper region 60.

Because this revamp process minimizes the number of gratings 72 that must be used and they can be supported on the stripping media distributor 46*a*, it substantially reduces installation time and maximizes refinery operation time.

Specific Embodiments

While the following is described in conjunction with specific embodiments, it will be understood that this description is intended to illustrate and not limit the scope of the preceding description and the appended claims.

A first embodiment of the invention is a process for separating a gaseous hydrocarbon product stream from catalyst particles comprising contacting a hydrocarbon feed stream with catalyst particles in an elongated riser to produce gaseous hydrocarbon products; disengaging catalyst particles from the gaseous hydrocarbon products; stripping the catalyst particles with stripping media over structural packing in a hydrocarbon rich and stripping media lean environment in an upper region of a stripping section and stripping the catalyst particles with stripping media in a stripping media rich and hydrocarbon lean environment in a lower region of the stripping section An embodiment of the invention is one, any or all of prior embodiments in this paragraph up through the first embodiment in this paragraph further comprising distributing stripping media to the lower region. An embodiment of the invention is one, any or all of prior embodiments in this paragraph up through the first embodiment in this paragraph wherein the lower region is at least 10 feet (3 m) tall. An embodiment of the invention is one, any or all of prior embodiments in this paragraph up through the first embodiment in this paragraph further comprising passing the catalyst through a grating in the lower region. An embodiment of the invention is one, any or all of prior embodiments in this paragraph up through the first embodiment in this paragraph further comprising distributing fluidizing media above the grating. An embodiment of the invention is one, any or all of prior embodiments in this paragraph up through the first embodiment in this paragraph further comprising generating a dense catalyst bed in the stripping section and a top of the structural packing being located at a top of the dense catalyst bed. An embodiment of the invention is one, any or all of prior embodiments in this paragraph up through the first embodiment in this paragraph further comprising limiting admittance of hydrocarbons into the lower region.

A second embodiment of the invention is an apparatus for separating catalyst particles from a gaseous product stream comprising an elongated riser in which a hydrocarbon feed is contacted with catalyst particles to produce a gaseous product, the riser including an outlet for discharging the solid catalyst particles and gaseous products; a stripping section in communication with the outlet; an upper region of the stripping section comprising a structural packing and a lower region of the stripping section comprising a stripping media distributor and the lower region being at least 10 feet (3 m) tall. An embodiment of the invention is one, any or all of prior embodiments in this paragraph up through the second embodiment in this paragraph further comprising a grating in the lower region of the stripping section. An embodiment of the invention is one, any or all of prior embodiments in this paragraph up through the second embodiment in this paragraph wherein a grating is supported by the stripping media distributor. An embodiment of the invention is one, any or all of prior embodiments in this paragraph up through the second embodiment in this paragraph further comprising a fluidizing media distributor above the grating. An embodiment of the invention is one, any or all of prior embodiments in this paragraph up through the second embodiment in this paragraph wherein a top of the structural packing is at the top of the stripping section. An embodiment of the invention is one, any or all of prior embodiments in this paragraph up through the second embodiment in this paragraph wherein the lower region extends from a bottom of a lowest layer of structural packing to a middle of a catalyst outlet. The apparatus of claim further comprising a grating or stripping media distributor located no closer than 5 feet (1.5 m) from the closest adjacent grating or stripping media distributor.

A third embodiment of the invention is a process of revamping a stripping section of an FCC reactor comprising removing stripping internals from the stripping section; installing structural packing in an upper region of the stripping section; locating a bottom of the structural packing above the former elevation of the bottom of the stripping internals. An embodiment of the invention is one, any or all of prior embodiments in this paragraph up through the third embodiment in this paragraph wherein the internals spanned from a top elevation in the stripping section to a bottom elevation in the stripping section and installing the bottom layer of structural packing of the structural packing above the bottom elevation. An embodiment of the invention is one, any or all of prior embodiments in this paragraph up through the third embodiment in this paragraph further comprising installing a bottom of the structural packing at least 10 feet (3 m) above the bottom elevation. An embodiment of the invention is one, any or all of prior embodiments in this paragraph up through the third embodiment in this paragraph further comprising installing a grating in a lower region of the stripping section. An embodiment of the invention is one, any or all of prior embodiments in this paragraph up through the third embodiment in this paragraph further comprising supporting the grating with a stripping media distributor. An embodiment of the invention is one, any or all of prior embodiments in this paragraph up through the third embodiment in this paragraph further comprising installing a grating or a stripping media distributor no closer than 5 feet (1.5 m) from the next closest grating or stripping media distributor. An embodiment of the invention is one, any or all of prior embodiments in this paragraph up through the third embodiment in this paragraph further comprising spacing a grating or a stripping media distributor at a greater distance from the next closest grating or stripping media distributor than the greatest spacing of a layer of packing from the next closest layer of packing.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for separating a gaseous hydrocarbon product stream from catalyst particles comprising: contacting a hydrocarbon feed stream with catalyst particles in an elongated riser to produce gaseous hydrocarbon products; disengaging catalyst particles from said gaseous hydrocarbon products; stripping said catalyst particles with stripping media over structural packing in a hydrocarbon rich and stripping media lean environment in an upper region of a stripping section and stripping said catalyst particles with stripping media in a stripping media rich and hydrocarbon lean environment in a lower region of said stripping section; and generating a dense catalyst bed in said stripping section and a top of said structural packing being located at a top of the dense catalyst bed.

2. The process of claim 1 further comprising distributing stripping media to said lower region.

3. The process of claim 1 wherein said lower region is at least 10 feet (3 m) tall.

4. The process of claim 1 further comprising passing said catalyst particles through a grating in said lower region.

5. The process of claim 4 further comprising distributing fluidizing media above said grating.

6. The process of claim 1 further comprising limiting admittance of hydrocarbons into the lower region.

7. A process for separating a gaseous hydrocarbon product stream from catalyst particles comprising: contacting a hydrocarbon feed stream with catalyst particles in an elongated riser to produce gaseous hydrocarbon products; disengaging catalyst particles from said gaseous hydrocarbon products; stripping said catalyst particles with stripping media over structural packing in a hydrocarbon rich and stripping media lean environment in an upper region of a stripping section and stripping said catalyst particles with stripping media in a stripping media rich and hydrocarbon lean environment in a lower region of said stripping section;
  passing said catalyst particles through a grating in said lower region; and
  generating a dense catalyst bed in said stripping section and a top of said structural packing being located at a top of the dense catalyst bed.

8. The process of claim 7 further comprising distributing fluidizing media above said grating.

9. The process of claim 7 further comprising distributing stripping media to said lower region.

10. The process of claim 7 further comprising limiting admittance of hydrocarbons into the lower region.

11. The process of claim 7 wherein no more than a height of a layer of the structural packing separates a top layer of the structural packing from a top of the stripping section.

12. The process of claim 7 wherein said lower region is at least 10 feet (3 m) tall.

13. The process of claim 7 wherein said grating is located above a stripping media distributor for distributing fluidizing media below the grating in said lower region.

* * * * *